US012019613B2

(12) United States Patent
Murti et al.

(10) Patent No.: US 12,019,613 B2
(45) Date of Patent: Jun. 25, 2024

(54) DATA INTEGRITY AND CONSENSUSES WITH BLOCKCHAIN

(71) Applicant: EMC IP Holding Company LLC, Hopkinton, MA (US)

(72) Inventors: Arun Murti, Mission Viejo, CA (US); Adam E. Brenner, Mission Viejo, CA (US); Mark D. Malamut, Aliso Viejo, CA (US); Joey C. Lei, Irvine, CA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 695 days.

(21) Appl. No.: 16/516,138

(22) Filed: Jul. 18, 2019

(65) Prior Publication Data

US 2021/0019301 A1  Jan. 21, 2021

(51) Int. Cl.
*G06F 16/23* (2019.01)
*G06F 16/27* (2019.01)

(52) U.S. Cl.
CPC ...... *G06F 16/2365* (2019.01); *G06F 16/2379* (2019.01); *G06F 16/27* (2019.01)

(58) Field of Classification Search
CPC ... G06F 16/2379; G06F 16/2365; G06F 16/27
USPC ........................................................ 707/703
See application file for complete search history.

(56) References Cited

U.S. PATENT DOCUMENTS

| | | | |
|---|---|---|---|
| 8,433,666 B2* | 4/2013 | Matsumura | G06F 16/951 706/45 |
| 8,819,252 B1* | 8/2014 | Szeto | H04L 63/1458 709/227 |
| 10,922,652 B2* | 2/2021 | Ma | G06F 16/2379 |
| 2010/0278191 A1* | 11/2010 | Gupta | H04L 63/1458 370/419 |
| 2012/0072725 A1* | 3/2012 | Fanton | H04L 9/3239 713/165 |
| 2013/0212603 A1* | 8/2013 | Cooke | G06F 9/5027 719/328 |
| 2014/0112148 A1* | 4/2014 | Flinta | H04L 43/10 370/235.1 |
| 2014/0283066 A1* | 9/2014 | Teddy | G06F 21/51 726/23 |

(Continued)

FOREIGN PATENT DOCUMENTS

EP     3226169     10/2017

OTHER PUBLICATIONS

Sagirlar, Gokhan, et al., "AutoBotCatcher: Blockchain-based P2P Botnet Detection for the Internet of Things", CIC 2018, Philadelphia, PA, Oct. 18-20, 2018, 8 pages.*

(Continued)

*Primary Examiner* — Robert Stevens
(74) *Attorney, Agent, or Firm* — Workman Nydegger (57) ABSTRACT

One example method includes receiving, from an entity, a proposed entry for a ledger, where the ledger is shared and accessible by multiple users and includes a whitelist and a blacklist, determining, or assigning, a credibility score and rate limiter value for the entity, comparing the credibility score and rate limiter value with respective credibility score and rate limiter value thresholds, determining that the credibility score and rate limiter value meet or exceed the respective credibility score and rate limiter value thresholds, and submitting the proposed entry to the ledger.

20 Claims, 4 Drawing Sheets

(56) References Cited

U.S. PATENT DOCUMENTS

| | | | |
|---|---|---|---|
| 2017/0279818 A1* | 9/2017 | Milazzo | H04L 63/1433 |
| 2017/0364576 A1* | 12/2017 | Chesla | H04L 63/105 |
| 2018/0067920 A1* | 3/2018 | Cho | G06F 40/242 |
| 2018/0130061 A1* | 5/2018 | Caldera | G06Q 20/34 |
| 2019/0026456 A1* | 1/2019 | Hon | G06F 21/40 |
| 2019/0036930 A1* | 1/2019 | Bartik | G06F 21/577 |
| 2019/0073666 A1* | 3/2019 | Ortiz | H04L 9/0637 |
| 2019/0082007 A1* | 3/2019 | Klarman | H04L 63/123 |
| 2019/0102157 A1* | 4/2019 | Caldato | G06F 9/547 |
| 2019/0122258 A1* | 4/2019 | Bramberger | G06N 3/08 |
| 2019/0215277 A1* | 7/2019 | Dhanoa | H04L 47/528 |
| 2019/0319987 A1* | 10/2019 | Levy | H04L 9/3226 |
| 2019/0333097 A1* | 10/2019 | Sohum | H04L 63/101 |
| 2020/0067723 A1* | 2/2020 | Anders | H04L 12/1827 |
| 2020/0186355 A1* | 6/2020 | Davies | H04L 9/3221 |
| 2020/0371833 A1* | 11/2020 | Baset | H04L 63/123 |
| 2021/0158353 A1* | 5/2021 | Yang | G06Q 40/00 |
| 2022/0129481 A1* | 4/2022 | Galindo | H04L 63/108 |

OTHER PUBLICATIONS

Kouzinopoulos, Charalampos S., et al., "Using Blockchains to Strengthen the Security of Internet of Things", First International ISCIS Security Workshop 2018, Euro-CYBERSEC 2018, London, UK, Feb. 26-27, 2018, pp. 367-375.*

Malik, Sidra, et al., "TrustChain: Trust Management in Blockchain IoT supported Supply Chains", Blockchain 2019, Jul. 14-17, 2019, Atlanta, GA, pp. 184-193.*

Charles Noyes: "BitAV: Fast Anti-Malware by Distributed Blockchain Consensus and Feedforward Scanning", Jan. 7, 2016 URL: https://arxiv.org/pdf/1601.01405.pdfabstract.

International Search Report and Written Opinion issued in Application No. PCT/US2020/024139 dated Jul. 7, 2020.

* cited by examiner

DATA INTEGRITY AND CONSENSUSES WITH BLOCKCHAIN

FIELD OF THE INVENTION

Embodiments of the present invention generally relate to data protection. More particularly, at least some embodiments of the invention relate to systems, hardware, software, computer-readable media, and methods for facilitating data integrity through user consensus with respect to whitelisting and blacklisting of files.

BACKGROUND

Malware, viruses and ransomware are known threats to data integrity, and there are a number of measures that exist for detecting these threats. Users of hardware and software systems are concerned that such malware, viruses and ransomware will adversely affect the integrity of backups performed by their data protection systems, and/or will potentially be re-introduced into the environment when backups are restored.

In one approach to problems such as these, a variety of databases are used that contain information concerning the data, and the possible threats to the data. However, such approaches have proven ineffective in preventing or defeating threats, at least because the databases are disconnected from each other, such that there is little or no sharing of information between users of the databases. Another shortcoming with this approach is that the databases are managed by different respective entities with presumed trust. Finally, because multiple different databases are employed, by multiple users, it is not apparent which users can be trusted and which cannot.

BRIEF DESCRIPTION OF THE DRAWINGS

In order to describe the manner in which at least some of the advantages and features of the invention can be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

DETAILED DESCRIPTION OF SOME EXAMPLE EMBODIMENTS

Embodiments of the present invention generally relate to data protection. More particularly, at least some embodiments of the invention relate to systems, hardware, software, computer-readable media, and methods for facilitating data integrity by way of user consensus with respect to whitelisting and blacklisting of files.

In general, example embodiments of the invention may employ a trustless data repository (TDR) comprising, or consisting of, a distributed ledger to which any user can contribute (a) a list of one or more files to whitelist, and/or (b) a list of one or more files to blacklist. The distributed ledger serves as a write only database where entries can only be added but never modified, deleted or changed, once committed. Creation of this data repository in the form of a distributed ledger enables users to validate, contribute and condense information to a single repository, and also to trust, or not, as the case may be, the data in the repository, and the users who contribute entries to the repository. Such functionality can, but need not necessarily, be implemented in backup and restore software as a mechanism to alert users to the existence of harmful data.

In one example embodiment, a single trustless data repository is created that comprises, or consists of, a distributed ledger to which users and automated processes can contribute (a) a list of files to whitelist and/or (b) a list of files to blacklist, for the purpose of data integrity. In this way, a user can access the ledger to determine, for example, if a website or file that the user is considering using is safe or not. Embodiments of the invention may employ a distributed ledger may comprise, or consist of, blockchain technology and processes. By creating this single data repository on a distributed ledger, users and automated processes will be able to validate and contribute data, both whitelist and blacklist. Finally, each submitter is assigned a credibility score that can be used as a basis for determining whether or not entries will be permitted to the distributed ledger.

Advantageously then, embodiments of the invention may provide various benefits and improvements relative to conventional hardware, systems and methods. To illustrate, an embodiment of the invention may provide, and enable the use of, data integrity information that is condensed into a single repository, as compared with a siloed depository configuration that uses multiple databases. Embodiments of the invention enable the integrity of the data in a single repository to be ensured by consensus among the users of the repository, thus avoiding any need for multiple different databases. This functionality may be particularly useful with respect to data that is shared by multiple users. As well, administrative overhead associated with establishment and maintenance of data integrity may be reduced, relative to approaches involving multiple data repositories, since only a single data repository is employed, and multiple users of the repository participate in policing the data and screening other users. Embodiments of the invention may improve the operation and effectiveness of existing data protection systems, methods, hardware, and software by integrating new data integrity assurance functionality in those data protection systems, methods, hardware, and software.

It should be noted that the foregoing advantageous aspects of various embodiments are presented only by way of example, and various other advantageous aspects of example embodiments of the invention will be apparent from this disclosure. It is further noted that it is not necessary that any embodiment implement or enable any of such advantageous aspects disclosed herein.

A. Aspects of Example Operating Environments

The following is a discussion of aspects of example operating environments for various embodiments of the invention. This discussion is not intended to limit the scope of the invention, or the applicability of the embodiments, in any way. In addition to the following discussion, further details concerning example operating environments in which embodiments of the invention may be implemented are disclosed in the Related Applications.

In general, embodiments of the invention may be implemented in connection with systems, software, and components, that individually and/or collectively implement, and/or cause the implementation of, data management operations. Such data management operations may include, but are not limited to, data read/write/delete operations, data backup operations, data restore operations, data cloning operations, data archiving operations, and disaster recovery operations. Thus, while the discussion herein may, in some aspects, be directed to a discussion of data protection environments and operations, the scope of the invention is not so limited. More generally then, the scope of the invention embraces any operating environment in which the disclosed concepts may be useful. By way of illustration, but not limitation, embodiments of the invention may be employed in connection with, and/or incorporated into, data backup and restore platforms, systems and devices, examples of which include, but are not limited to, the Dell-EMC NetWorker and Avamar platforms, Dell-EMC Enterprise Copy Data Management (ECDM), Dell-EMC Integrated Data Protection Appliance (IDPA), Dell-EMC PowerProtect, and/or data protection environments such as Dell-EMC DataDomain.

A data protection environment may take the form of a public or private cloud storage environment, an on-premises storage environment, and hybrid storage environments that include public and private elements, although the scope of the invention extends to any other type of data protection environment as well. Any of these example storage environments, may be partly, or completely, virtualized. The storage environment may comprise, or consist of, a datacenter which is operable to service read and write operations initiated by one or more clients.

In addition to the storage environment, the operating environment may also include one or more host devices, such as clients for example, that each host one or more applications. As such, a particular client may employ, or otherwise be associated with, one or more instances of each of one or more applications. In general, the applications employed by the clients are not limited to any particular functionality or type of functionality. Some example applications and data include email applications such as MS Exchange, filesystems, as well as databases such as Oracle databases, and SQL Server databases, for example. The applications on the clients may generate new and/or modified data that is desired to be protected.

Any of the devices or entities disclosed herein may be protected by one or more data protection policies according to various embodiments of the invention. Yet other examples of devices that may be protected by way of a data protection policy according to embodiments of the invention include, but are not limited to, containers, and VMs.

Any of the devices, including the clients, servers and hosts, in the operating environment can take the form of software, physical machines, or virtual machines (VM), or any combination of these, though no particular device implementation or configuration is required for any embodiment. Similarly, data protection system components such as databases, storage servers, storage volumes (LUNs), storage disks, replication services, backup servers, restore servers, backup clients, and restore clients, for example, can likewise take the form of software, physical machines or virtual machines (VM), though no particular component implementation is required for any embodiment. Where VMs are employed, a hypervisor or other virtual machine monitor (VMM) can be employed to create and control the VMs.

As used herein, the term 'data' is intended to be broad in scope. Thus, that term embraces, by way of example and not limitation, data segments such as may be produced by data stream segmentation processes, data chunks, data blocks, atomic data, emails, objects of any type, files, contacts, directories, sub-directories, volumes, and any group of one or more of the foregoing.

Example embodiments of the invention are applicable to any system capable of storing and handling various types of objects, in analog, digital, or other form. Although terms such as document, file, block, or object may be used by way of example, the principles of the disclosure are not limited to any particular form of representing and storing data or other information. Rather, such principles are equally applicable to any object capable of representing information.

In general, example embodiments of the invention embrace, among other things, integration of blockchain technology into data protection systems in order to enable establishment of a list of files known to be safe, or unsafe, for use. In this way, users are able to verify whether a particular file, such as 'windows.dll' for example, is safe to use, that is, the file is free from malware, viruses, ransomware, or other elements that could compromise user data and/or operations if the file were to be employed by the user.

More specifically, a database can be implemented in some embodiments as a trustless data repository (TDR) operating in connection with a distributed ledger to which any user can contribute (a) a list of one or more files to whitelist, and/or (b) a list of one or more files to blacklist. Whitelisted files and blacklisted files are permitted, by consensus of the users, to be listed in the TDR. The ability of a user to list a file in a whitelist or blacklist in the ledger can be controlled through the use of a credibility score and a rate limiter, both of which are specific to that user.

Figure 1:
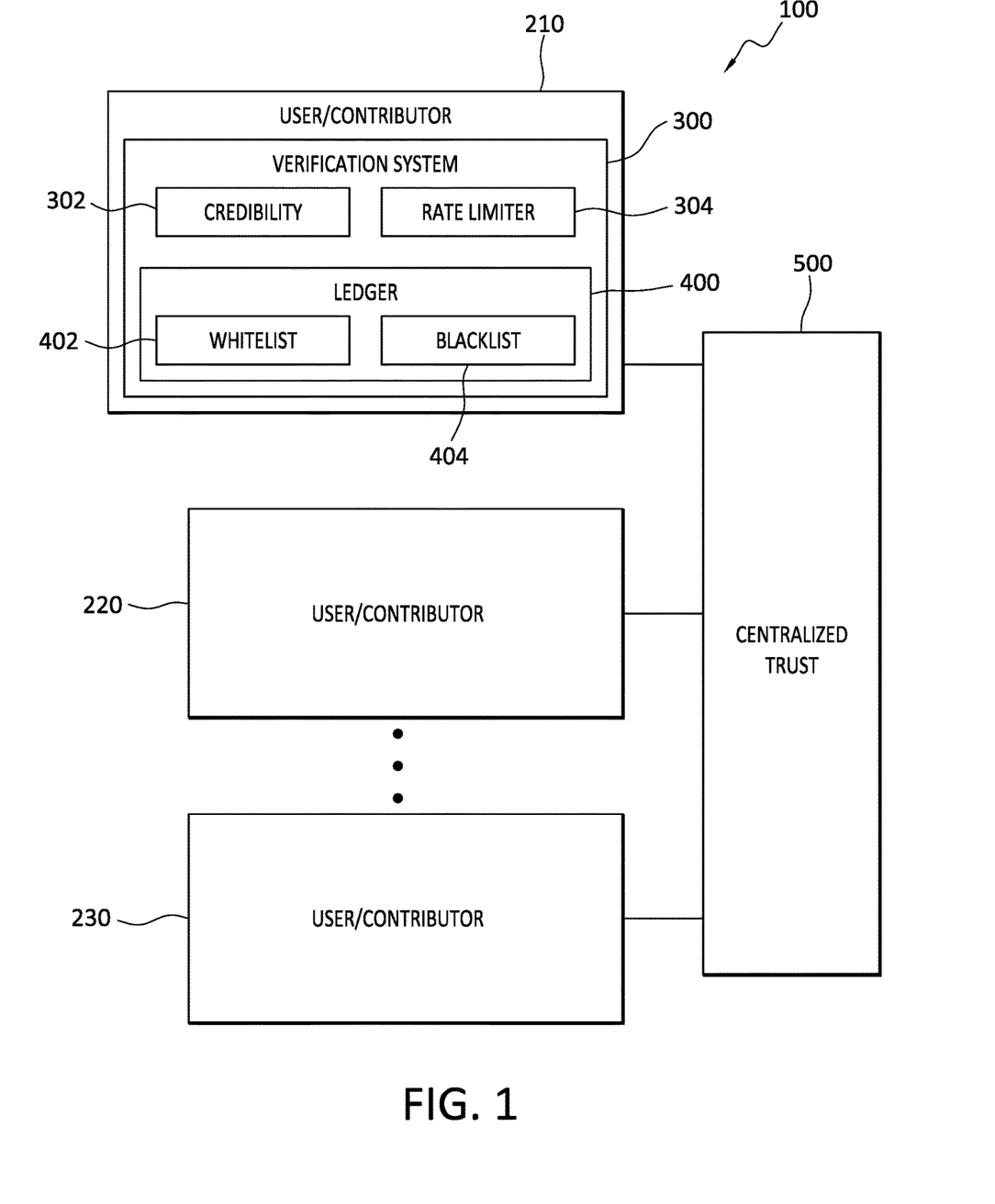
FIG. 1 discloses aspects of an example operating environment and components of some embodiments of the invention.

With particular attention now to FIG. 1, an example operating environment 100 may comprise, or consist of, a data protection environment. The data protection environment can include an enterprise datacenter, or a cloud datacenter, or both. The data protection environment may support various data protection processes, including data replication, data deduplication, cloning, data backup, and data restoration, for example. As used herein, the term backups is intended to be construed broadly and includes, but is not limited to, partial backups, incremental backups, full backups, clones, snapshots, continuous replication, and any other type of copies of data, and any combination of the foregoing. Any of the foregoing may, or may not, be deduplicated.

In general, the example configuration in FIG. 1 comprises various user/contributors (UC) 210, 220 and 230. In general, and as disclosed herein, an entity such as 210, 220, and 230 for example, can be both a user and a contributor, or only a user, or only a contributor. Users, contributors, and user/contributors, are referred to herein generally as UCs. Any number of UCs can exist in an environment. As used herein, a user comprises, or consists of, one or more entities, such as applications for example, that use credibility scores in connection with their operations such, for example, determining whether or not to use a particular file or files for such operations. A contributor comprises, or consists of, any entity or entities, such as computing systems, software, and hardware, for example, that submit one or more entries for inclusion in a ledger.

Each of the UCs 210, 220 and 230 are configured to include an instance of a verification system 300 that includes a credibility engine 302, and a rate limiter engine 304. The verification system 300 also includes a ledger 400 that includes a whitelist 402 and a blacklist 404. In other embodiments, the ledger 400 can be located other than in the verification system 300. While not specifically indicated in FIG. 1, the UCs 220 and 230 each include respective instances of the verification system 300.

Finally, a centralized trust entity 500 also communicates with the respective ledger 400 copies in each of the UCs 210, 220 and 230. While not specifically illustrated, one or more of the UCs 210, 220 and 230 may include one or more applications which, in operation, use one or more files referenced in the ledger 400. The centralized trust entity 500 can be any entity, or entities, acknowledged by the UCs to be trustworthy. Thus, example centralized trust entities might include McAfee, Symantec, Dell, or Microsoft.

With brief initial reference to the ledger 400 elements, the whitelist 402 comprises a list of elements known to be free of viruses, malware, ransomware, or any other elements that could compromise user operation or data. Such elements include, but are not limited to, files, website names, program names, and unique fingerprints of programs, files, and other data at the driver and/or directory level, where one example of a unique fingerprint is a hash. Similarly, the blacklist 404 comprises a list of elements known to include aspects that could compromise user operation or data if the file were used, where such elements may include virus files, malware, ransomware, website names, files, program names, and unique fingerprints of programs, files, and data, for example. In some embodiments at least, the ledger 400 is implemented in the form of a blockchain, but any other mechanism(s) of comparable functionality to a blockchain can alternatively be used.

The ledger 400 may be accessible by the UCs 210, 220 and 230 by way of the verification system 300. In general, UCs comprise any entity that is able to add data to, remove data from, and/or modify data in, the ledger 400. UCs 210, 220 and 230 comprise any entity that is able to read data from the ledger 400 for the purpose of determining whether or not a particular file, employed by the user or intended to be employed by the user, is on the whitelist 402 or blacklist 404. Example users include, but are not limited to, a backup application such as the Dell-EMC Avamar platform. Some example operations of a user in connection with the files listed in the ledger 400 are discussed below. In some cases, an entity can be both a user and a contributor, while in other cases, an entity can be only a user, or only a contributor. Other example UCs can include automated systems, and software. As explained in more detail elsewhere herein, the ability of any user to submit an entry to the whitelist 402 or the blacklist 404 may be regulated by a credibility score module 302 and rate limiter module 304.

With continued reference to FIG. 1, and while not explicitly illustrated there, each of the UCs 210, 220 and 230 may be able to communicate directly with each of the other UCs 210, 220 and 230. Thus, for example, when a particular UC 210, 220 and 230 submits a request to add an entry to the whitelist 402 or the blacklist 404, that request can be transmitted from that particular UC 210, 220 and 230 to all of the other UCs 210, 220 and 230. The UCs that receive the request can evaluate the request based on the credibility score and/or rate limiter value of the requestor and may submit recommendations and/or other input to the verification system 300 indicating whether or not those UCs approve of the requested entry.

The example operating environment 100 may further include a centralized trust 500 that is arranged to communicate with the various instances of the ledger 400. In general, the centralized trust 500 is an entity, or group of entities, known to be trustworthy. As such, and discussed elsewhere herein, the centralized trust 500 may be used to initially seed the ledger 400 with new entries. At this initial seeding stage, which can be omitted in some embodiments, the centralized trust 500 may be unconstrained by a rate limiter, or by a credibility score. When the initial seeding is completed, the centralized trust 500 can be accorded the same status as any other UC and, as such, further contributions to the ledger 400 by the centralized trust 500 can be constrained by a credibility score, as determined by the credibility engine 302 for example, and a rate limiter value, as determined by the rate limiter engine 304 for example.

B. Aspects of an Example Ledger

With continued reference to FIG. 1, further details are provided concerning a ledger, one example of which is the ledger 400. As noted earlier, copies of the ledger 400 reside at each of the UCs. In general, the ledger, which can be a TDR ledger, will allow data from multiple users or UCs to be incorporated into the ledger 400, when permitted by the verification system 300. Initially, each record in the ledger 400 can be a copy from one or more sources such as, for example, a public or private database that includes whitelist and/or blacklist records. When data needs to be added, updated, or removed, from the ledger 400, new entries showing the change in status (added, updated or removed) will be added while preserving old entries. Among other things, preserving the old entries will enable the performance of audits, and due to the ledger 400 construction, none of the entries can be modified, which protects against actions by rogue actors.

As noted earlier, the construction and use of the ledger 400 can be in accordance with any of a variety of blockchain processes. In general, each entry in the ledger 400, or block of entries in the ledger 400, contains a unique identifier of the immediately preceding block in the blockchain. This unique identifier may be, for example, a hash of the entire content of the immediately preceding block, and the ledger 400 can use a linked list such as a data structure for example. As a new block is created, the new block will include the hash of the immediately preceding block, and so forth for each block in the blockchain.

UCs to the ledger 400 can include users, as well as automated systems, and software, that can add data to, and update data in, the ledger 400. For example, a trusted operating system (OS) provider, such as Microsoft, might include all operating system file hashes into the ledger 400 as part of the whitelist 402. Additionally, or alternatively, such a trusted provider may also serve as a centralized trust 500.

To illustrate with an example, a data protection system or software, such as the Dell-EMC Avamar platform for example, can query the verification system 300 for a particular fingerprint, such as a hash for example, that it sees during a normal backup operation performed by the data protection system. In response, the verification system 300 can query the ledger 400 and return a matching hash, from either the whitelist 402 or the blacklist 404, to the data protection system. In some embodiments, the verification system 300 may employ a bloom filter, or comparable mechanism, to improve the performance of the ledger 400 search.

The returned matching hash may be identified to the data protection system as having been found on either the whitelist 402 or the blacklist 404. If the returned hash is a blacklist 404 hash, then the data protection system can flag, as potentially problematic, the hash that was seen during the backup operation. On the other hand, if the returned hash is a whitelist 402 hash, then the data protection system is assured that the hash that was seen during the backup operation is trusted. If, in response to the query from the data protection system, the verification system 300 does not locate a matching hash in the ledger, the data protection system can be so notified.

To illustrate with an example, if Microsoft provides, in the ledger 400, a hash value of '1a' for a file called 'Windows.dll' and Avamar sees a hash value of '9z' for that same file, Avamar can flag the file for review, since the mismatch between the hashes '1a' and '9z' may call into question the authenticity and safety of the 'Windows.dll' file identified by Avamar during the backup operation. Alternatively, an entry may already exist in the ledger 400 for the same file with hash '9z' as a known malware (blacklist) and Avamar could flag that as well. In this way, a UC such as Avamar can use the whitelist/blacklist information to avoid problems during operations performed by the UC, or at the direction of the UC.

Example embodiments of a ledger may include other features as well. For example, one or more entries in the ledger 400 can have extended attributes associated with them to offer flexibility to the UCs 210, 220 and 230. One example of such an extended attribute includes the ability to version files. With continued reference to the aforementioned example, while Microsoft might provide a hash value of '1a' for a file called 'Windows.dll,' Microsoft may in the future release a new hash value of '4h' that corresponds to an updated version of the file 'Windows.dll' that has been released.

In this example, the extended attributes will allow UCs 210, 220 and 230 of the ledger 400 to match the version of the file they have. If no version is found, then the UCs 210, 220 and 230 can decide whether or not to trust the contents of the file.

C. Aspects of an Example Verification System and Operations

With the foregoing discussion of example ledgers in view, details are provided now concerning aspects of a verification system, one example of which is generally denoted at 300, for ensuring that only good, or trusted, data is added to the ledger 400. Particularly, before an entity can contribute an entry to the ledger 400 however, the entry must be verified by the verification system 300 and, as such, submissions from a UC 210, 220, 230, for example, must pass to the verification system 300 first and then, if verified, are transmitted by the verification system 300 to the ledger 400 for entry. As noted earlier, an individual, organization, or other entity, may be permitted to contribute (a) a list of files to the whitelist 402 and/or (b) a list of files to the blacklist 404. Accordingly, embodiments of the invention employ a verification system 300 with verification functionality to ensure the validity of data proposed for inclusion in a whitelist 402 or blacklist 404. Among other things, the verification system 300 is operable to prevent Distributed Denial-of-Service (DDoS) attacks on the ledger 400, as well as to prevent rogue actors from contributing bogus or malicious data or other elements to the ledger 400. Example embodiments of a verification system 300 include credibility score (CS) functionality which can be implemented by the credibility engine 302, and/or rate limiter (RL) functionality which can be implemented by the rate limiter engine 304.

In some embodiments, the verification system 300 functionality can be implemented as software-as-a-service (SaaS) that runs on a cloud site, on premises, and/or elsewhere, and is accessible by the UCs 210, 220 and 230. In other embodiments, the verification system 300 can be implemented on a stand-alone server configured for communication with the ledger 400 and UCs 210, 220 and 230. In still other embodiments, and as exemplified by the configuration disclosed in FIG. 1, respective instances of a verification system 300 can be implemented on each of 'n' UCs. No particular implementation configuration of a verification system 300 is required however.

Initially, and as discussed earlier, a centralized trust 500, such as RSA (creator of the RSA cryptosystem), Dell, and Microsoft for example, to an individual or organization is established that operates to seed data into the ledger 400. That is, a purpose of the centralized trust 500 is to seed data into the ledger 400 and, over a period of time, thereby decrease or eliminate the need for further seeding by the centralized trust 500. To accomplish this, each UC to the ledger 400 is assigned two attributes, namely, a credibility score (CS) and a rate limiter (RL).

In general, and as discussed below, the credibility engine 302 and rate limiter engine 304, which can be collectively implemented in a single engine, or in separate respective engines, serve to control the addition of entries, and the implementation of other changes, to the ledger 400. Such engine(s) may act alone, or in concert with the non-submitting UCs, to determine whether or not a requested entry to the ledger 400 will be made. As used herein, an 'entry' to a ledger is intended to be broadly construed and embraces, among other things, any change to the ledger, whether by addition of a new item, modification of an existing item, or addition of an entry that invalidates an older item, in a whitelist or blacklist. Both the rate limiter and credibility score can be applied on a single UC basis, or applied to a defined group of UCs. The credibility engine 302 and/or rate limiter engine 304 can operate autonomously, and/or based on input from one or more of the UCs 210, 220 and 230.

The credibility score (CS) generally reflects the extent to which a particular UC 210, 220 and 230, for example, is considered by the credibility engine 302 and/or by the other UCs 210, 220 and 230 for example, to be trustworthy, such that the particular UC 210, 220 or 230 should be allowed to contribute entries to the ledger 400. As noted earlier, during the initial creation of the ledger 400, the centralized trust 500 that seeded the ledger 400 may have a relatively high credibility score. The centralized trust 500 can, for a period of time at least, add new entries to the ledger 400 without being constrained by limitations or mechanisms such as a rate limiter. After seeding has been completed, no special consideration is given to the centralized trust member(s) 500 and, with respect to their ability to contribute to the ledger 400, it/they will be treated in the same way as the other UCs 210, 220 and 230. In some embodiments, the centralized trust 500 can comprise a plurality of UCs, for example, such as different software companies. In other embodiments, the centralized trust 500 consists of a single UC.

Initially, each UC 210, 220 and 230, with the possible exception of the centralized trust user(s) 500, has an initial credibility score set to a default of zero. As a UC adds entries to the ledger 400, their credibility score may increase or decrease. The credibility score can increase, for example, when the UC adds a new entry to the ledger that invalidates an older entry. Referring back to the example for a file called 'Windows.dll,' Microsoft might add a new entry to the ledger 400 that reflects a new version of a file because the hash of Windows.dll has changed to '2e' from '1a.' A credibility score may also increase, for example, if an entry never gets invalidated, thus demonstrating, or at least supporting a presumption, that the entry is a valid entry.

As well, a credibility score may decrease, for example, when multiple UCs submit entries to the ledger 400 that invalidate older data. To illustrate, suppose a rogue actor has been permitted by the verification system 300 to submit an entry to the ledger 400 with a hash value of '6f' for the file 'Windows.dll,' but Microsoft and RSA both add new entries that invalidate or contradict the submission of the rogue actor. In this case, the credibility score of the rogue actor would decrease while, at the same, time the respective credibility scores of both Microsoft and RSA would increase. Credibility scores can be determined and used on a per-file basis and/or a user basis.

More generally, any data, indicators, or events, directly or indirectly indicative of the likelihood that a file lacks integrity or has some other problem, can be used by the credibility engine 302 as a basis for generating a credibility score. As such, the foregoing are presented only by way of example and are not intended to limit the scope of the invention in any way. Moreover, and as noted elsewhere herein, the credibility engine 302 may also consider input from one or more UCs in the calculation of a credibility score.

In terms of its implementation, the use of the credibility score generated by the credibility engine 302 can be included, for example, in data protection products such as the Dell-EMC Avamar platform, and the Dell-EMC PowerProtect Data Manager platform. As such, the data protection product, or other software that employs credibility score information, is able to make decisions, on a per-file basis, whether or not to use a particular file based on the credibility score of the entity that contributed that file to the whitelist or blacklist, as applicable. More generally, consideration of credibility scores can be incorporated in any software, hardware, or system that uses, or is expected to use, a file that is tracked, or may be tracked, in the ledger 400. Thus, the scope of the invention is not limited for use in data protection applications.

Thresholds for the acceptability of a credibility score can be set by the application, by a user, or by the credibility engine 302, for example. Thus, if a user credibility score relating to a file meets or exceeds a particular threshold, the application may proceed to use the file. On the other hand, if the credibility score does not meet the threshold, then the application may determine not to use the file, and may also flag the file as potentially problematic. For example, during a restore operation performed by a backup and restore application, the credibility score of a user can be shown as an indication of possible malware, or viruses, contained in a file that is used in connection with performance of the restore operation. The same data, on a per file basis, can be used by the application to generate an aggregate report on a per asset view, or infrastructure wide view.

In addition to credibility score functionality implemented by a credibility engine 302, the verification system 300 may also include a rate limiter engine 304 that specifies how often a UC can submit entries to the ledger. In general, the rate limiter engine 304 can set a limit, which can be adjusted, to the rate at which a UC can contribute entries to the ledger 400. The value set by the rate limiter engine 304 for a particular UC can be set based upon the credibility score of that UC and/or based upon input from one or more other UCs.

Thus, a high rate limit for a particular UC means that UC can make a relatively high number of submissions to the ledger 400 per unit of time. Likewise, a lower rate limiter value means a UC will have to wait longer between submissions. Each UC has an initial rate limiter value such as one submission per hour for example, but this value can change as seen fit by the ledger 400 community, which may comprise, or consist of, the other UCs. As well, the credibility score of a UC can be an input to the rate limit assigned to that UC. Thus, for example, if the UC has a low credibility score, the rate limit for that UC may be correspondingly low. That is, that UC may, for example, only be permitted to contribute one entry per day to the ledger 400. In this way, if the UC were to attempt, for example, a DDoS attack comprising hundreds of thousands of contributions in a 24 hour period, all but one of those contributions would, effectively, be blocked.

As such, a rate limiter value for a UC can prevent that UC from attacking the ledger 400, such as by spamming, DDoS, or a 'fifty one percent' attack. Similar to the credibility score functionality, for every positive submission to the ledger 400, the rate limit for that individual UC is increased. Conversely, for every negative submission that occurs, the rate limiter is decreased. A higher rate limiter value means that a particular UC can submit more entries to the ledger 400 in a given amount of time. As used herein, a positive submission is one which, either initially or over a period of time, has demonstrated a relatively high credibility for any reasons. On the other hand, as used herein, a negative submission is one which either initially or over a period of time, has demonstrated a relatively low credibility for any reason.

To illustrate with an example, in an environment where 3 of 4 users, each comprising a node for example, want to make a malicious entry to a ledger, the entries can be prevented or at least reduced, by a rate limiter, notwithstanding that the 3 users outnumber the 1 remaining user. Further suppose that the 3 users are relatively new and have low, or zero, credibility scores. In this case, the fact that a majority of the nodes are engaging in the attempt to add a malicious entry to the ledger is attenuated by the low respective credibility scores of those nodes. Thus, notwithstanding that the nodes attempting to make malicious entries may constitute a majority of nodes in the system, their respective low credibility scores implicate correspondingly low rate limits. As such, only a few, or one, or none, of the malicious entries can be made in a specified timeframe.

D. Example Host and Server Configurations

Figure 2:
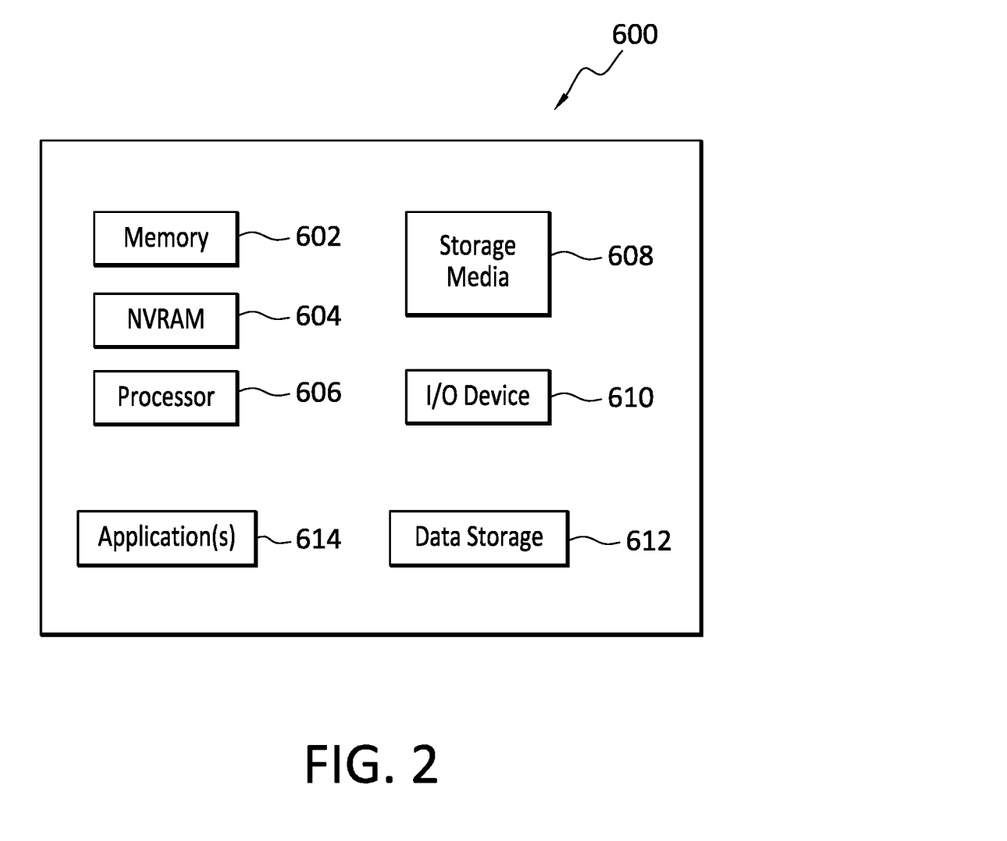
FIG. 2 discloses aspects of an example host configuration.

With reference briefly now to FIG. 2, any one or more of the UCs 210, 220, 230, verification system 300, credibility engine 302, rate limiter engine 304, ledger 400, whitelist 402, blacklist 404, and centralized trust 500, can take the form of, or include, or be implemented on, or hosted by, a physical computing device, one example of which is denoted at 600. As well, where any of the aforementioned elements comprise or consist of a virtual machine (VM), that VM may constitute a virtualization of any combination of the physical components disclosed in FIG. 2.

In the example of FIG. 2, the physical computing device 600 includes a memory 602 which can include one, some, or all, of random access memory (RAM), non-volatile random access memory (NVRAM) 604, read-only memory (ROM), and persistent memory, one or more hardware processors 606, non-transitory storage media 608, UI device 610, and data storage 612. One or more of the memory components 602 of the physical computing device 600 can take the form of solid state device (SSD) storage. As well, one or more applications 614 are provided that comprise executable instructions. Such executable instructions can take various forms including, for example, instructions executable to perform any function, method, or portion thereof, disclosed herein, and/or executable by/at any of a storage site, whether on-premises at an enterprise, or a cloud storage site, client, datacenter, backup server, blockchain network, or blockchain network node, to perform functions disclosed herein. As well, such instructions may be executable to perform any of the other operations disclosed herein including, but not limited to, blockchain ledger operations, ledger entry submissions, credibility score determinations, rate limiter value determinations, and use of credibility scores and/or rate limiter values in connection with operations performed by applications, systems, or devices.

E. Example Methods

Figure 3:
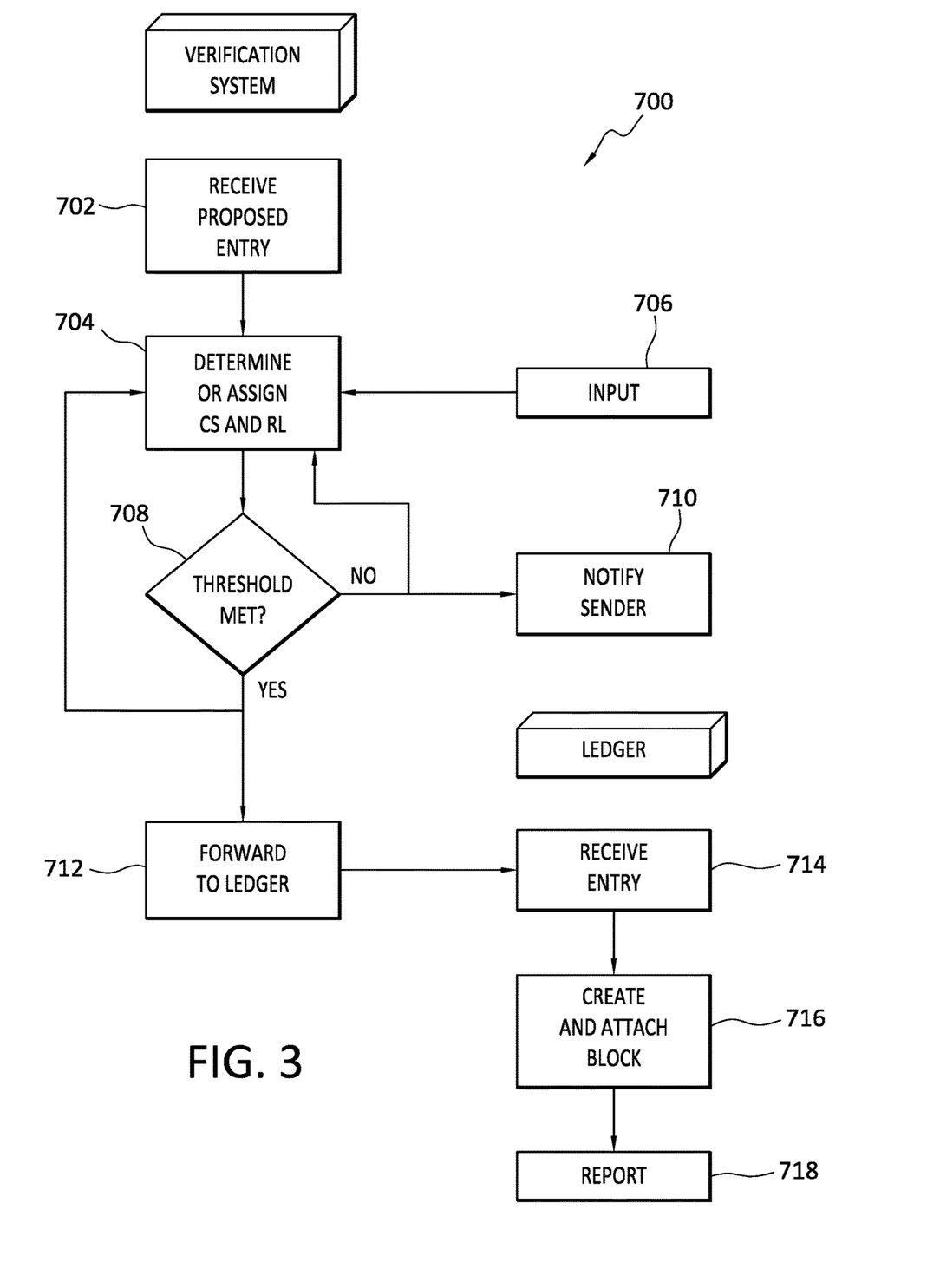
FIG. 3 is a flow diagram that discloses some general aspects of an example method for verifying entries to a shared ledger.

With attention now to FIG. 3, aspects of example methods are disclosed. One particular method is denoted generally at 700 and concerns the handling of proposed ledger entries submitted by one or more UCs. The example method 700 may be cooperatively performed by multiple entities, such as a verification system and ledger for example. However, the functional allocation indicated in FIG. 3 is provided only by way of example, and in other embodiments, the disclosed functions may be allocated differently amongst the various entities. It should also be noted, that as with the other methods and processes disclosed herein, the order of the various processes in the method 700 may be different than the order indicated, and the disclosed processes are not required to be performed in the order indicated in the Figures.

The example method 700 may begin when a verification receives 702, from a UC such as a user/contributor, a proposed entry for a whitelist or blacklist of a ledger. The entry can take a wide variety of forms, and the scope of the invention is not limited to the examples set forth herein. By way of example, the entry may (i) identify a file, website, or other element, that is to be listed in either the whitelist or the blacklist, (ii) identify a new version of a file, website, or other element, that is to be listed in either the whitelist or the blacklist, (iii) identify an element that is to be removed from either the whitelist or the blacklist, or (iv) invalidate an older entry, such as in the aforementioned versioning example.

Upon receipt 702 of the proposed entry, the verification system then 704 determines, or assigns, as applicable, a credibility score (CS) and rate limiter value (RL) for the entity that submitted the proposed entry. If the UC is not previously known to the verification system, the CS and RL may be assigned according to default values. For example, the default CS may be zero, that is, neutral, and the RL may be similarly low, such as one submission per 24 hour period, for example. In general, the defaults for CS and RL can be set to any value, and can be changed as needed. If the UC is known, the verification system can look up, such as in a database accessible by the verification system, the current CS and RL for that UC. Alternatively, the proposed entry transmitted by the UC and received 702 by the verification system may include the CS and RL information for that UC.

As part of the process of determining or assigning CS and RL values 704, input 706 may be received by the verification system from one or more sources, and this input can be used as a basis for assigning and/or adjusting one or both of the CS and RL values. For example, if the UC is a well-known and trusted software company, but has never interacted with the ledger before, information about the company may be used as an input 706 to assignment of a CS and RL value for that UC. In this example, CS and RL values that are higher than the default values may be assigned, since the company, that is, the UC, is well-known and trusted. The input 706 can be provided by any source, including one or more other UCs, and may additionally or alternatively include information concerning previous transactions involving the UC, if the proposed entry that was received 702 is not a first-time submission by the UC.

After the CS and RL have been determined, or assigned, a determination 708 is made as to whether the CS meets an established threshold for the submitting UC, and also whether the timing of the proposed entry is consistent with the RL of that UC. Various outcomes of the determination 708 are possible. In one case, the CS may meet the threshold, but if the timing of the proposed entry is not consistent with the RL, the proposed entry may be held 710 until enough time has passed that the RL requirement is met, after which the proposed entry may be forwarded 712 to the ledger. If the entry is held, the UC may be so notified 710. In another case, both the CS and RL criteria are met, and the proposed entry is forwarded to the ledger 712 without delay. In still another case, if it is determined 708 that the CS is not met, then the proposed entry will be refused and the submitting UC notified.

With continued reference to FIG. 3, and the aforementioned examples, the results of the inquiry at 708 can be used in subsequent determinations 704 of the CS and RL for the UC. Depending upon the results of the inquiry 708, the CS and/or RL of the UC can be increased, such as when the entry is forwarded to the ledger, or decreased, such as when the entry is refused.

As noted above, if the CS and RL thresholds are met at 708, the proposed entry submitted by the UC is then forwarded 712, such as by the verification system, to the ledger. The ledger receives 714 the entry and then uses the entry as a basis to create a new block, such as by hashing the entry and the immediately preceding block together, and then the ledger attaches the new block to the blockchain 716. Thus, the process 716 constitutes addition of the entry to the ledger. After the entry has been added 716 to the ledger, the ledger then reports 718 to the UC and/or other entities, that the ledger has been updated to include the entry.

While not specifically shown in FIG. 3, it is noted that the ledger may be seeded prior to performance of the method 700. Some example seeding processes are disclosed elsewhere herein.

Figure 4:
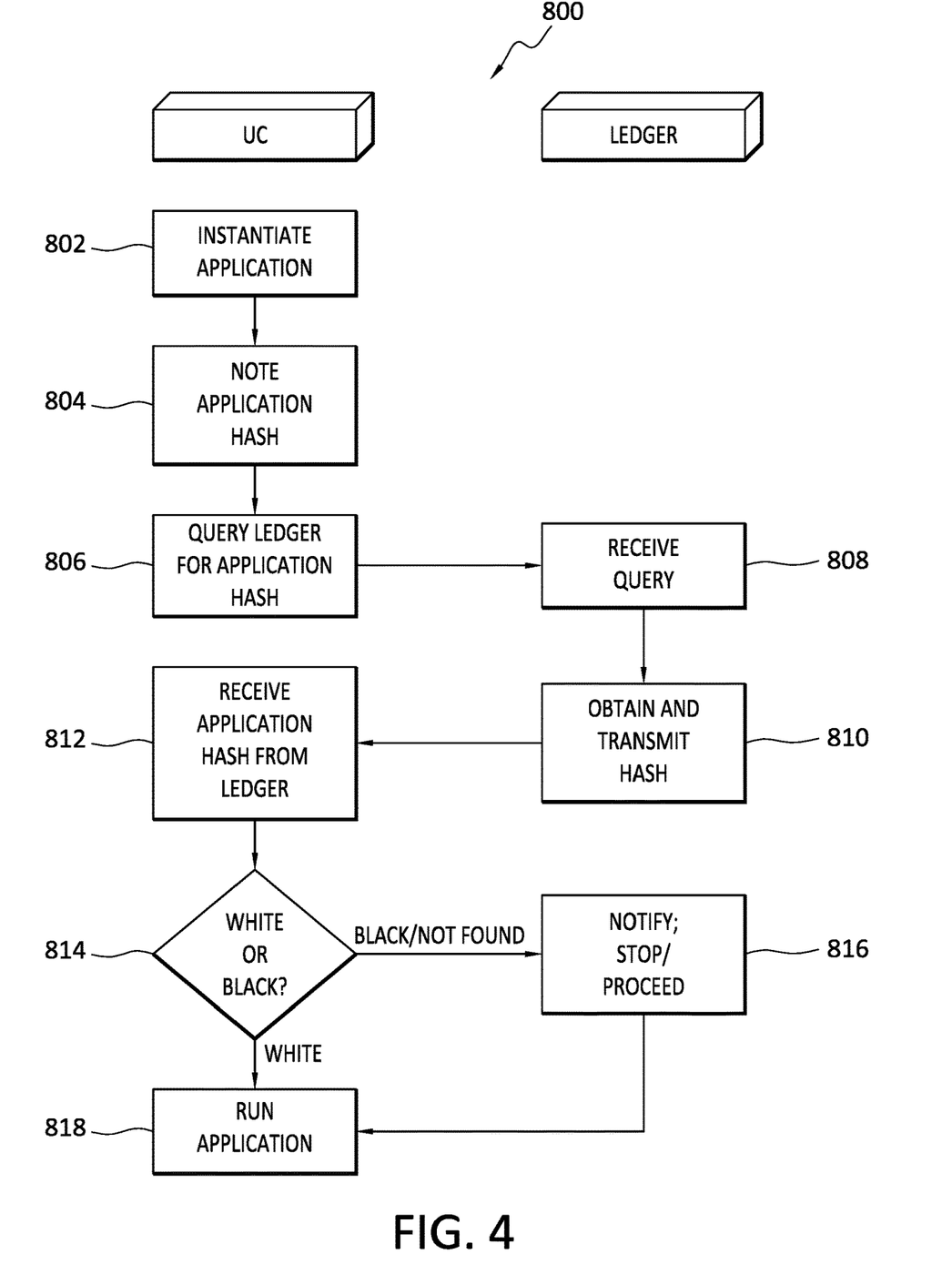
FIG. 4 is a flow diagram that discloses some general aspects of an example method for using whitelist and blacklist information of a ledger.

Turning now to FIG. 4, details are provided concerning methods for using CS and/or RL values in connection with the operations of an application or the other use of an element, where one example of such a method is denoted generally at 800. The example method 800 can begin when an application hosted at a UC is instantiated 802, such as at, or by, a UC. The application can be any application that has a corresponding entry in a whitelist or a blacklist of a ledger. As well, it is not necessary that an application be instantiated at 802, rather, and more generally, the process at 802 can involve the use of any element that has a corresponding entry in a whitelist or a blacklist of a ledger, and examples of such elements are disclosed herein. As such, the reference in the discussion of the method 800 to an application is solely for illustrative purposes, and is not intended to limit the scope of the invention in any way.

At some point, a hash of the application is noted 804. The hash of the application can be calculated by a UC, provided to the UC, or obtained from some other source. Next, the UC can query 806 the ledger to see if the ledger has the application hash held by the UC. The ledger receives 808 the query, and returns 810 a matching hash, from either the whitelist or the blacklist, to the UC. The response 810 to the query 806 may also include, in addition to the hash, an indication as to whether the hash was found in the whitelist, or the blacklist.

The UC receives 812 the hash, and the corresponding whitelist/blacklist indication. If the response 810 is found 814 to indicate that the returned hash came from the whitelist, then the UC is assured that the application corresponding to the hash it holds is safe to use, since the returned whitelist hash matches the hash held by the UC. In this case, the UC may proceed to run the application 818.

On the other hand, if the response 810 is found 814 to indicate that the returned hash came from the blacklist, then the UC is made aware that the application corresponding to the hash it holds may not be safe to use, since the returned blacklist hash matches the hash held by the UC. In this case, the UC may raise a notification or flag 816 advising of a potential problem with use of the application.

In some instances, the response 810 may indicate that the hash that was the subject of the query 806 was not found in the ledger. In this case, the UC may raise a flag and either stop or proceed with running of the application corresponding to the hash held by the UC.

As the example methods 700 and 800 thus illustrate, embodiments of the invention can involve the creation of a ledger having a whitelist and a blacklist that contain information concerning elements that may be employed during the operations of a UC. In particular, the UC can use the ledger information to determine whether or not particular elements are safe to use. Because the addition of information to the ledger is controlled, users have some assurance that the data in the ledger is trustworthy and reliable. As well, the ledger is configured and implemented to receive information from multiple disparate sources, and can thereby avoid the problems that attend the use of multiple disconnected databases that may include unverified information.

F. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein.

As indicated above, embodiments within the scope of the present invention also include computer storage media, which are physical media for carrying or having computer-executable instructions or data structures stored thereon. Such computer storage media can be any available physical media that can be accessed by a general purpose or special purpose computer.

By way of example, and not limitation, such computer storage media can comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which can be used to store program code in the form of computer-executable instructions or data structures, which can be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' can refer to software objects or routines that execute on the computing system. The different components, modules, engines, and services described herein may be implemented as objects or processes that execute on the computing system, for example, as separate threads. While the system and methods described herein can be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention can be performed in client-server environments, whether network or local environments, or in any other suitable environment. Suitable operating environments for at least some embodiments of the invention include cloud computing environments where one or more of a client, server, or other machine may reside and operate in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:
1. A method, comprising:
  in a group that comprises a first user/contributor and a second user/contributor that are each operable to receive and evaluate proposed distributed ledger entries from the other:

receiving, by the first user/contributor from the second user/contributor, a proposed entry for addition to a distributed ledger, where the distributed ledger comprises a whitelist and a blacklist;

determining, by a credibility engine, a credibility score for the second user/contributor;

inputting the credibility score into the rate limiter engine and determining a rate limiter value;

assigning, by the first user/contributor, the rate limiter value for the second user/contributor;

comparing, by the first user/contributor, the credibility score and rate limiter value of the second user/contributor with respective credibility score and rate limiter value thresholds;

determining, by the first user/contributor, that the credibility score and rate limiter value of the second user/contributor meet or exceed the respective credibility score and rate limiter value thresholds;

based on the determining, submitting, by the first user/contributor, the proposed entry to either the whitelist or the blacklist of the distributed ledger; and updating the credibility score, by the credibility engine, and the rate limiter value, by the rate limiter engine, based on where the proposed entry is located in the distributed ledger.

2. The method as recited in claim 1, wherein the proposed entry is identified by the second user/contributor as either a whitelist candidate or a blacklist candidate.

3. The method as recited in claim 1, wherein the method is performed by a verification system that includes a credibility score engine and a rate limiter engine.

4. The method as recited in claim 1, wherein the credibility score is based in part on any prior transactions involving an entity.

5. The method as recited in claim 1, wherein the submitting of the proposed entry to either the whitelist or the blacklist of the distributed ledger indicates a consensus of the group that the proposed entry is permitted to be listed in the distributed ledger.

6. The method as recited in claim 1, wherein the rate limiter value specifies a maximum number of submissions that the entity is permitted to make within a time period of a particular length.

7. The method as recited in claim 1, further comprising:
receiving, by a member of the group, from another member of the group, another proposed entry for the distributed ledger;

determining, by the member of the group, that a credibility score and a rate limiter value associated with the another member of the group do not meet respective credibility score and rate limiter value thresholds for the another entity; and refusing the another proposed entry to the distributed ledger, and the refusing the another proposed entry indicates a consensus of the group that the proposed entry is not permitted to be listed in the distributed ledger.

8. The method as recited in claim 7, further comprising adjusting the credibility score and/or the rate limiter value of the another member of the group based upon the determination that the credibility score and rate limiter value of the another member of the group do not meet the respective credibility score and rate limiter value thresholds for the another member of the group.

9. The method as recited in claim 1, further comprising adjusting the credibility score and/or the rate limiter value based upon the determination that the credibility score and rate limiter value meet or exceed the respective credibility score and rate limiter value thresholds.

10. The method as recited in claim 1, wherein the proposed entry identifies one of: a file; a website address; malware; or, ransomware.

11. A non-transitory storage medium having stored therein instructions which, when executed by one or more hardware processors, perform operations comprising:
receiving, by the first user/contributor from the second user/contributor, a proposed entry for addition to a distributed ledger, where the distributed ledger comprises a whitelist and a blacklist;

determining, by a credibility engine, a credibility score for the second user/contributor;

inputting the credibility score into the rate limiter engine and determining a rate limiter value;

assigning, by the first user/contributor, the rate limiter value for the second user/contributor;

comparing, by the first user/contributor, the credibility score and rate limiter value of the second user/contributor with respective credibility score and rate limiter value thresholds;

determining, by the first user/contributor, that the credibility score and rate limiter value of the second user/contributor meet or exceed the respective credibility score and rate limiter value thresholds;

based on the determining, submitting, by the first user/contributor, the proposed entry to either the whitelist or the blacklist of the distributed ledger; and updating the credibility score, by the credibility engine, and the rate limiter value, by the rate limiter engine, based on where the proposed entry is located in the distributed ledger.

12. The non-transitory storage medium as recited in claim 11, wherein the proposed entry is identified by the second user/contributor as either a whitelist candidate or a blacklist candidate.

13. The non-transitory storage medium as recited in claim 11, wherein the operations are performed by a verification system that includes a credibility score engine and a rate limiter engine.

14. The non-transitory storage medium as recited in claim 11, wherein the credibility score is based in part on any prior transactions involving an entity.

15. The non-transitory storage medium as recited in claim 11, wherein the submitting of the proposed entry to either the whitelist or the blacklist of the distributed ledger indicates a consensus of the group that the proposed entry is permitted to be listed in the distributed ledger.

16. The non-transitory storage medium as recited in claim 11, wherein the rate limiter value specifies a maximum number of submissions that the entity is permitted to make within a time period of a particular length.

17. The non-transitory storage medium as recited in claim 11, wherein the operations further comprise:
receiving, by a member of the group, from another member of the group, another proposed entry for the distributed ledger;

determining, by the member of the group, that a credibility score and a rate limiter value associated with the another member of the group do not meet respective credibility score and rate limiter value thresholds for the another entity; and refusing the another proposed entry to the distributed ledger, and the refusing the another proposed entry indicates a consensus of the group that the proposed entry is not permitted to be listed in the distributed ledger.

18. The non-transitory storage medium as recited in claim 17, further comprising adjusting the credibility score and/or the rate limiter value of the another member of the group based upon the determination that the credibility score and rate limiter value of the another member of the group do not meet the respective credibility score and rate limiter value thresholds for the another member of the group.

19. The non-transitory storage medium as recited in claim 11, wherein the operations further comprise adjusting the credibility score and/or the rate limiter value based upon the determination that the credibility score and rate limiter value meet or exceed the respective credibility score and rate limiter value thresholds.

20. The non-transitory storage medium as recited in claim 11, wherein the proposed entry identifies one of: a file; a website address; malware; or, ransomware.

* * * * *